(12) United States Patent
Hamacher et al.

(10) Patent No.: US 12,510,008 B2
(45) Date of Patent: Dec. 30, 2025

(54) TEMPERATURE MANAGEMENT SYSTEM

(71) Applicant: SPH Sustainable Process Heat GmbH, Overath (DE)

(72) Inventors: Tim Hamacher, Neunkirchen-Seelscheid (DE); Andreas Mück, Bergisch Gladbach (DE)

(73) Assignee: SPH Sustainable Process Heat GmbH, Bergisch Gladbach (DE)

( * ) Notice: Subject to any disclaimer, the term of this patent is extended or adjusted under 35 U.S.C. 154(b) by 0 days.

(21) Appl. No.: 18/097,326

(22) Filed: Jan. 16, 2023

(65) Prior Publication Data

US 2023/0151744 A1 May 18, 2023

Related U.S. Application Data

(63) Continuation of application No. PCT/EP2021/069722, filed on Jul. 15, 2021.

(30) Foreign Application Priority Data

Jul. 16, 2020 (DE) .................. 10 2020 118 854.4

(51) Int. Cl.
*F01M 5/00* (2006.01)
*F25B 31/00* (2006.01)
*G05D 23/19* (2006.01)

(52) U.S. Cl.
CPC ........... *F01M 5/005* (2013.01); *F25B 31/002* (2013.01); *G05D 23/1902* (2013.01); *F01M 2250/60* (2013.01)

(58) Field of Classification Search
CPC .............. F01M 55/005; F01M 55/007; F01M 2250/60; F25B 31/002; G05D 23/1902; F04C 29/02; F04B 39/02
See application file for complete search history.

(56) References Cited

U.S. PATENT DOCUMENTS 3,874,192 A * 4/1975 Kato .................... F25B 31/004
62/468
5,318,151 A 6/1994 Hood et al.
(Continued)

FOREIGN PATENT DOCUMENTS

CN 105593474 A 5/2016
DE 102011086476 4/2013
(Continued)

OTHER PUBLICATIONS

International Search Report and Written Opinion for Application No. PCT/EP2021/069722, dated Oct. 15, 2021, 18 pages.
(Continued)

*Primary Examiner* — Marc E Norman
(74) *Attorney, Agent, or Firm* — Wood Herron & Evans LLP

(57) ABSTRACT

A temperature management system, such as for a lubricant (3) contained in a lubricant reservoir (1) of a compressor system (2) for a heat pump that pumps a working medium, method for controlling a lubricant temperature, and heat pumps having a temperature management system, where the temperature of the lubricant (3) can be set flexibly, dynamically and in line with requirements, increasing the service life of the lubricant and improving the operating performance of the heat pump.

4 Claims, 2 Drawing Sheets

(56) References Cited

U.S. PATENT DOCUMENTS

| | | | |
|---|---|---|---|
| 5,653,120 A * | 8/1997 | Meyer | F24D 15/04 |
| | | | 62/324.4 |
| 10,054,053 B2 * | 8/2018 | Thiriet | F02C 3/04 |
| 2007/0027938 A1 | 2/2007 | Clarke | |
| 2009/0087320 A1 | 4/2009 | Tanaka et al. | |
| 2012/0011872 A1 | 1/2012 | Dugast et al. | |
| 2012/0090340 A1 | 4/2012 | Okamoto et al. | |
| 2013/0152882 A1 | 6/2013 | Potter | |
| 2013/0288843 A1 * | 10/2013 | Baum | F16H 57/0436 |
| | | | 184/14 |
| 2016/0003510 A1 | 1/2016 | De Larminat et al. | |
| 2019/0277549 A1 * | 9/2019 | Nishiyama | F25B 41/20 |
| 2021/0190394 A1 * | 6/2021 | Togano | F25B 31/004 |

FOREIGN PATENT DOCUMENTS

| | | |
|---|---|---|
| JP | S57-006275 A | 1/1982 |
| JP | 2005180809 A | 7/2005 |
| JP | 2015025578 A | 2/2015 |
| JP | 2017003212 A | 1/2017 |
| WO | 2015/044613 A1 | 4/2015 |

OTHER PUBLICATIONS

Chinese Application No. CN202180060813.8, Office Action, Feb. 24, 2025.

German Application No. 10 2020 118 854.4, Search Report, Jan. 27, 2021.

JP2023-502685 Office Action dated Jul. 31, 2025.

* cited by examiner

TEMPERATURE MANAGEMENT SYSTEM

CROSS-REFERENCE TO RELATED APPLICATIONS

This application is a continuation under 35 U.S.C. § 120 of co-pending International Patent Application No. PCT/EP2021/069722 filed Jul. 15, 2021, and claims benefit under 35 U.S.C. § 119(a)-(d) to German Patent Application No. 10 2020 118 854.4 filed Jul. 16, 2020, all of which are hereby incorporated by reference in its entirety as part of the present disclosure.

FIELD OF THE INVENTION

The present disclosure relates to temperature management systems and methods for lubricant in a reservoir, such as for a compressor system of a heat pump, including but not limited to a high temperature heat pump.

BACKGROUND

Heat pumps are used, for example, to absorb thermal energy from a first external medium (e.g., ambient air or liquids) using technical or mechanical effort, thereby transferring it to a second external medium as useful energy or useful heat in addition to the drive energy used. The second external medium is a medium to be heated. When implementing such a system in a geothermal plant, the first external medium of liquids contained in the ground or rock can be provided, but, in industrial processes, waste heat can also serve as the first external medium.

Currently, heat pumps are commonly used for heating buildings. However, application of heat pumps to generate heat required for industrial processes are also known. For industrial processes, high-temperature heat pumps with media temperatures of >100° C. are often used.

DE 10 2011 086 476 A1 describes basic heat pump principles using the example of a high-temperature heat pump. The heat pump comprises a fluid circuit for absorbing thermal energy via the fluid and from at least one first reservoir using technical effort and for discharging thermal energy via the fluid to at least one second reservoir for heating the at least one second reservoir.

In addition to an evaporation unit (evaporator), a condensation unit (condenser), and an expansion unit (e.g., expansion tank), heat pumps (including high-temperature heat pumps) comprise a compression unit (compressor) for compressing a working medium circulating in a fluid circuit as a standard. The term "compression unit" is also often referred to as a "compressor." In this specification, the term "compressor system" is generally used throughout, as the actual compressor usually interacts directly with other components, such as a drive unit driving the compressor (e.g., an electric motor) and a lubricant reservoir.

From the evaporation unit, the working medium transformed from the liquid to the gaseous state is sucked in by the compressor and compressed to a pressure level that is required to liquefy the working medium. While the (for example, electrically) driven compressor compresses the vaporous working medium from a low outlet pressure level to a higher final pressure level, the temperature of the working medium increases. There are various compressor variants, for example, reciprocating compressors, scroll compressors, screw compressors, rotary compressors and rotary compressors (this list is not exhaustive). Reciprocating compressors, for example, are based on the principle that a moving piston sucks in the gaseous working medium through a suction valve when the piston moves downwards into a cylinder surrounding the piston. The working medium is compressed when the piston experiences an upward movement. In reciprocating compressors, the intake valve is closed during compression of the working medium. The working medium leaves the compressor via a pressure valve if the pressure in the cylinder exceeds a pressure level present on a high-pressure side of the compressor.

Such compressors/compressor systems can include a lubricant reservoir for holding a lubricant. Lubricant reservoirs are often referred to as "oil sumps." However, because lubricants other than oil can be used, the term "lubricant reservoir" is used herein. The lubricant is used to lubricate components of the compressor or compressor system, e.g., the moving components of the compressor (e.g., pistons, cylinders, bearings, valves, etc.). The oil or lubricant is sucked in from the oil sump or lubricant reservoir and transported to the respective points to be lubricated. As is known, the "lubricant" can include one lubricant or a mixture of lubricants.

It is known that, during standstill or shutoff of a heat pump, liquid working medium (e.g., refrigerant) can accumulate in the oil sump (lubricant reservoir) of the compressor and mix with the oil or lubricant, or gaseous working medium can dissolve into this. As a result, the viscosity of the oil or lubricant can be reduced, and the lubricating effect can be reduced. Other lubricating properties of the lubricant can also be negatively impacted by working medium dissolved in the lubricant or work fluid mixed with it. If a mixture of lubricant and working medium is conveyed to the areas to be lubricated instead of the lubricant, this can lead to a reduced lubricating effect. Ultimately, this can result in increased friction between the moving components or in the bearings, which can lead to increased mechanical wear. In order to counteract this, oil or lubricant heaters are used to decrease viscosity, with which the lubricant can be heated when the heat pump is at a standstill. Typically, such heating systems use electric heating rods in the oil sump/lubricant reservoir, or electric heating strips surrounding the oil sump or the lubricant reservoir.

SUMMARY

At least some embodiments disclosed herein seek to address, inter alia, certain disadvantages of issues presented the aforementioned systems.

During operation of a heat pump, it is desired that the lubricant has a desired if not optimum viscosity in order to provide the best possible lubricating effect. The viscosity of the lubricant depends on, e.g., the proportion of the working medium dissolved or distributed in the lubricant (e.g., refrigerant) and also on the temperature of the lubricant. The solubility of the working medium in the lubricant is determined by the temperature of the lubricant and the pressure of the gaseous working medium present in the compressor system (in particular, in the lubricant reservoir). While previously used working media (e.g., hydrofluorocarbons such as R134a) have a relatively low solubility in lubricants, modern working media (hydrofluoroolefins) often have a significantly higher solubility in lubricants. Thus, it is desirable that as much of the working medium mixed or dissolved in the lubricant is expelled from the lubricant. To achieve this, the lubricant is heated. Consequently, for the operation of a compressor system of a heat pump, it is desirable to keep the lubricant at a temperature level that is above a condensation temperature of the working medium (at a certain pressure of the working medium).

On the other hand, it is desired to keep the lubricant temperature as low as possible for the longest possible shelf-life or service life of the lubricant.

Accordingly, there is a need for a flexible, dynamic and situation-appropriate temperature setting or control of a lubricant used in a compressor system of a heat pump, particularly with current lubricants.

Consequently, the inventors seek to provide a temperature management system for a lubricant present in a lubricant reservoir of a compressor system of a heat pump that a working medium flows through, which temperature management system enables a flexible, dynamic and demand-adapted temperature setting of the lubricant to increase the lubricant service life on the one hand, and the operating performance of the heat pump on the other. The same is sought with the heat pump proposed herein and the methods proposed herein for controlling a lubricant temperature.

Such temperature management system can include a temperature measurement unit, a temperature sensor or a temperature probe that is configured to measure an actual lubricant temperature of the lubricant, a control unit or controller that is connected to the temperature measuring unit on a signaling technological level and is configured to check or determine whether the measured actual lubricant temperature is within a target lubricant temperature range, and a temperature controller or temperature-control element connected to the control unit on a signaling technological level, which is configured to heat or cool the lubricant. At least some embodiments may relate to or be used with a heat pump, such as, a high-temperature heat pump, In at least some embodiments, the controller or control unit is configured:
   a. to cause the temperature-control element to cool the lubricant, provided that the actual lubricant temperature is above the target lubricant temperature range, and
   b. to cause the temperature-control element to heat up the lubricant, provided that the actual lubricant temperature is below the target lubricant temperature range.

The present invention is suitable if not advantageous for high-temperature heat pumps with temperatures of the heat-absorbing external medium of >100° C. The said compressor system can comprise one or a plurality of compressor(s) of the types described herein, one or a plurality of reciprocating compressor(s). If a plurality of reciprocating compressors are implemented in the compressor system, i.e., an arrangement of reciprocating compressors, the reciprocating compressors can be supplied with lubricant from a common lubricant reservoir or from separate lubricant reservoirs. A "lubricant reservoir" can therefore also be understood as a single lubricant reservoir as well as a plurality of lubricant reservoirs. As mentioned at the beginning, an oil sump or an oil sump can also be subsumed under a lubricant reservoir, wherein the lubricant used does not necessarily have to be an oil. The compressor system or the compressor can comprise a crankcase (piston, connecting rod and crankshaft) (i.e., comprise such), also other components such as a cylinder head (gas flow and valve system) and the said lubricant reservoir. Where there are a plurality of separate lubricant reservoirs, each of the lubricant reservoirs can be assigned a separate temperature sensor or temperature measurement unit to measure a respective actual lubricant temperature of the lubricant(s) present in the individual reservoirs.

A "temperature measurement unit" is a unit suitable for measuring a material temperature of the lubricant present at a given time. In at least some embodiments, a temperature measuring unit can also measure the ambient temperature in proximity to the lubricant and derive or calculate the actual lubricant temperature from it.

In at least some embodiments, the temperature sensor or measuring probe is in direct contact with the lubricant and measures the actual lubricant temperature by means of a contact measurement. Such can be, for example, a contact thermometer, which requires thermal contact with the target (the lubricant or an ambient medium to be measured). Exemplary but non-limiting contact thermometers that can be used include expansion thermometers, vapor pressure thermometers, thermocouples, resistance thermometers, temperature sensors (integrated circuits with temperature output), foil thermometers, temperature measuring stiffeners, liquid crystal thermometers and gas thermometers. However, those skilled in the art should recognize that any suitable contact thermometer may be used.

Alternatively, the probe or sensor can be of a type that measures the actual lubricant temperature of the lubricant without contact (i.e., without direct material contact with the measured object). Such can be referred to as non-contact thermometers. These can include the temperature radiation of the lubricant by means of infrared sensors. However, those skilled in the art should recognize that any suitable non-contact thermometer may be used.

The temperature measuring unit is—as mentioned—connected to a control unit on a signaling technological level. A "connection on a signaling technological level" means that unidirectional or bidirectional data transfer can take place, which can occur via any suitable manner, such that there is operative communication. Thus, actual lubricant temperatures measured by the temperature measurement unit or corresponding data can be forwarded to the control unit. The temperature controller may also, in at least some embodiments, carry out data processing, for example in the sense of pre-processing, and convert raw data into a desired data format. However, this can also be done or supplemented in the controller. A "connection on a signaling technological level" can be wired or wireless. Wireless connections can be electromagnetic transmissions, such as, but not limited to radio connections, Bluetooth connections or WLAN connections, for example. Optical data transmission options are also envisioned, which can be wireless.

The controller or control unit can be part of a housing of the compressor system, near the compressor system (for example, in a housing of a control unit of the heat pump) or externally arranged. Also, the control unit can be or include an external computing unit, a server, a cloud server or similar.

The controller may be—as mentioned—configured to check whether the measured actual lubricant temperature is within a target lubricant temperature range. For this purpose, the control unit can be configured to perform a computational or algorithmic data comparison between the actual lubricant temperature and a target lubricant temperature range. The control unit can contain or use a database with stored target lubricant temperature range data, which have been determined, for example, from empirical values, machine values or otherwise. Such a database can also be arranged externally to the control unit in such a way that the control unit can access the data stored there via a suitable signal and data connection. Similarly, the controller can be configured to dynamically adjust the target lubricant temperature range as a function of one or more certain parameters (e.g., a pressure present in the lubricant reservoir) and the comparison with the actual lubricant temperature can be used as a basis. To carry out the aforementioned operations, the control unit can comprise a computer or data processor. The control unit can have a plurality of signal-connection interfaces, via which this can be connected on a signaling technological level, for example, to the temperature sensor or probe, temperature controller, and/or other components.

As mentioned, the temperature management system can comprise a temperature-control element connected to the controller on a signaling technological level, which is configured to heat or cool the lubricant. The temperature controller can be formed, for example, as a hollow chamber or a channel through which can flow through a heating or cooling medium (e.g., water), which is integrated into a cladding element such as a housing wall or a housing floor of the lubricant reservoir or is arranged on it. Alternatively, the temperature controller can include a plurality of channels (i.e., a channel system) or a plurality of hollow chambers (i.e., a hollow chamber system) which are flow-connected to each other. Conversely, the plurality of channels or hollow chambers can include separate flows from each other. Accordingly, the control unit can be connected to a plurality of temperature-control elements on a signaling technological level. The temperatures controllers can comprise a controller and/or regulator via which the supply line of the heating or cooling medium is controlled or regulated at a suitable temperature. For this purpose, the control and/or regulation unit can control interact with suitable supplies and discharges (e.g., pumps), which can cause the supply line or discharge line of the heating or cooling medium, and a required heating or cooling temperature is provided. In this case, the heating or cooling medium can originate from a source external to the heat pump, but can constitute a heat energy to the heat pump or heat absorbed by the heat pump, which are then supplied to the temperature controller(s). A mixer or mixing unit mixing the heating or cooling medium is also contemplated, which mixes media at different temperatures to a desired temperature of the heating or cooling medium. The controller can be connected to the control and/or regulation unit of the temperature controllers on a signaling technological level.

If it is determined by the controller by comparing the actual lubricant temperature with the target lubricant temperature range that the actual lubricant temperature is above the target lubricant temperature range (meaning a higher, i.e., warmer, temperature), the control unit can cause the temperature-control element to cool the lubricant. For this purpose, the controller can, for example, first generate a detection signal (based on the above the target lubricant temperature range lying actual lubricant temperature), which is converted into a command signal which, after passing on to the temperature controller or a controller and/or regulator associated with the temperature-control element, causes cooling of the lubricant by flowing through the temperature controller a cooling medium of suitable temperature. The temperature set in the temperature-control element (e.g., by the cooling medium) that is required to cool the lubricant down so that that the actual lubricant temperature is within the target lubricant temperature range can be determined by the respective controller and/or regulator assigned to the temperature-control element, the control unit, or under interaction of both.

Conversely, if it is determined in the control unit by comparing the actual lubricant temperature with the target lubricant temperature range that the actual lubricant temperature is below the target lubricant temperature range (meaning a lower, i.e., colder, temperature), the controller can cause the temperature controller to heat the lubricant. For this purpose, the control unit can first generate a detection signal (based on the actual lubricant temperature below the target lubricant temperature range), which is converted into a command signal which, after transmission to the temperature-control element or a control and/or regulation unit assigned to the temperature-control element, causes heating of the lubricant by flowing through the temperature-control element a heating medium of suitable temperature. The temperature to be set in the temperature controller (e.g., by the heating medium) that is required to heat the lubricant to such an extent that the actual lubricant temperature is again within the target lubricant temperature range can be determined by that control and/or regulation unit assigned to the temperature controller, the controller, the interaction of both.

In at least some embodiments, the lubricant temperature can be adjusted flexibly and dynamically. The system allows temperature control of the lubricant at a current time and allows—if necessary—an adjustment of the lubricant temperature. The temperature management system is suitable for use in continuous, i.e., continuous operation, which means that the lubricant temperature is continuously checked and adjusted. This can also be done at fixed time intervals, alternatively or additionally at a user-specified (i.e., desired) time.

As mentioned, the object of the inventors can be achieved with a heat pump, such as a high-temperature heat pump, comprising a temperature management system as disclosed herein. When used in high-temperature heat pumps, it improves reliable performance when as little gaseous working medium as possible is dissolved in the lubricant of the compressor system when starting up the high-temperature heat pump. Furthermore, the operation of high-temperature heat pumps also requires reliable lubrication of compressor components. These requirements are met by an implementation of temperature management systems disclosed herein in a high-temperature heat pump.

The inventors also contemplate methods of controlling a lubricant temperature of a lubricant present in a lubricant reservoir of a compressor system through a heat pump that a working medium flows through. The method can consist of the following steps:

a. measuring a pressure present in the lubricant reservoir;
b. identifying a condensation temperature of the working medium on the basis of the pressure measured at step a.;
c. specifying a target lubricant temperature range, wherein its lower temperature limit is the condensation temperature determined at step b., and wherein its upper temperature limit is 2 K-15 K, e.g., 5 K-10 K, above the condensation temperature of the working medium;
d. measuring an actual lubricant temperature of the lubricant;
e. comparing the actual lubricant temperature with the target lubricant temperature range, and then
    cooling of the lubricant, provided that the actual lubricant temperature is above the target lubricant temperature range, or
    heating of the lubricant, provided that the actual lubricant temperature is below the target lubricant temperature range.

It should be understood that the measured pressure corresponds to the condensation pressure of the working medium (e.g., refrigerant) in the lubricant reservoir or the compressor system (e.g., a crankcase connected to the lubricant reservoir or other component). The condensation pressure can be from the low-pressure side of the compressor system (evaporator, compressor gas inlet), because the lubricant reservoir and the crankcase can be directly connected to it. The (measurable) detectable pressure in the lubricant reservoir or an associated crankcase (or other component of the compressor system) corresponds to or corresponds to the condensation pressure of the working medium. Based on the condensation pressure, the condensation temperature of the working medium can be calculated. However, other parameters, measured values, empirical data, etc. can also be included for this purpose. However, the condensation temperature can also be calculated directly from the condensation pressure (where applicable, taking into account working medium-specific identification data or the geometry or volume of the lubricant reservoir/crankcase or a space present there—filled with gas).

In at least some embodiments, the disclosed methods can be carried out continuously or in a specified time interval. Semi-continuous or discontinuous management of the method is therefore also possible. The method can be carried out as required, and in an automated, semi-automated or manual manner.

Furthermore, the method can be performed so that the actual lubricant temperature is regulated so that it is always within the target lubricant temperature range. This helps provide a sufficiently stable lubricant temperature during the operation of a heat pump or the associated compressor system, accordingly helping to provide sufficient lubrication of the compressor components during the operation of the compressor system or the heat pump.

It should be understood that the invention is not to be limited to or constrained by particular embodiments described herein. For example, while embodiments disclosed herein are described with respect to thermodynamic heating systems, such as heat pumps, such as, e.g., high-temperature heat pumps, the invention my be used with thermodynamic cooling systems, for example, a refrigerator or an air-conditioning systems. Further, it should be understood that the invention may be used with any suitable compressor system designs, including, but not limited to, open compressor systems, semi-hermetic compressor systems, or hermetic compressor systems. In open compressor systems, the drive unit (motor) may be structurally separated from the compressor. In such systems, the compressor drive shaft may extend out of the housing and connected to the drive unit. In semi-hermetic compressor systems, the drive unit and the compressor may be arranged in a common housing. In a hermetic compressor system, the drive unit and compressor may also be arranged in a common housing, but in contrast to a semi-hermetic compressor system, this is completely outwardly welded or otherwise sealed.

Other details, features, objectives and advantages should be recognized by those skilled in the art, and in view of the following detailed description with reference to the Figures, which are understood not to be limiting. It should be noted that the features listed individually in the specification and claims can be combined in any manner to achieve further embodiments. It should also be noted that the term "and/or" or similar used herein may be interpreted as covering both the conjunctive and disjunctive.

DETAILED DESCRIPTION

Figure 1:
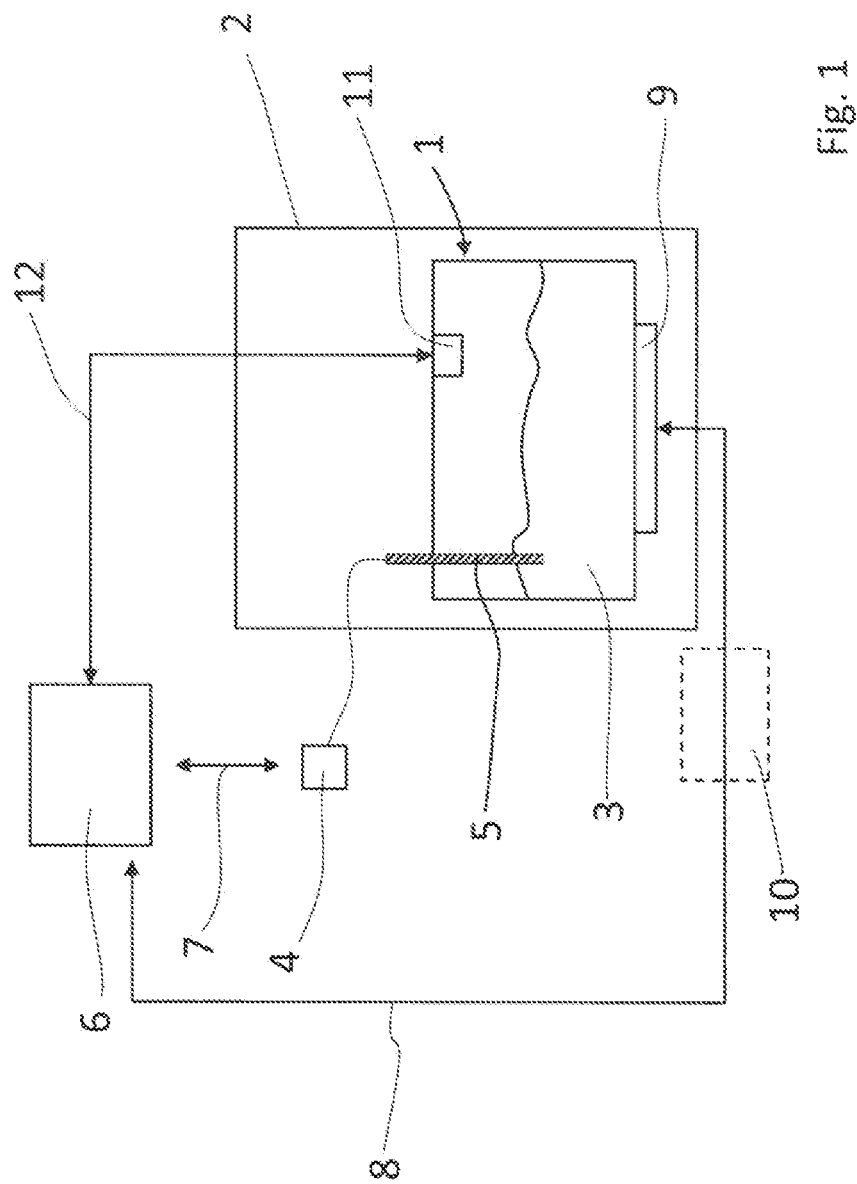
FIG. 1 is a schematic illustration of a temperature management system.

FIG. 1 schematically shows a temperature management system for a lubricant present in a lubricant reservoir 1 of a compressor system 2 of a heat pump lubricant 3. The temperature management system comprises a temperature measurement unit, sensor or probe 4 which is configured to measure an actual lubricant temperature of lubricant 3. The temperature measuring unit 4 shown in FIG. 1 is in contact with the lubricant 3 via a contact thermometer 5. Nevertheless, the temperature measuring unit 4 can also be formed in a contactless manner as those skilled in the art should understand. The temperature probe 4 can be integrated into the compressor system 2 or an associated housing.

Furthermore, the temperature management system comprises a controller 6 which is communicatively connected on a signaling technological level to the temperature measurement unit 4, for example via a wired or wireless signal connection 7. Via the signal connection 7, a data exchange between temperature sensor 4 and the control unit 6 takes place. Furthermore, a signal exchange for the implementation of control and regulation commands can take place via the signal connection 7. The controller unit is configured to check whether the measured actual lubricant temperature is within a target lubricant temperature range.

Furthermore, the temperature management system comprises a temperature controller 9 operatively connected to the controller 6 on a signaling technological level (i.e., via a wired or wireless signal connection 8), which is configured to heat or cool the lubricant 3. The temperature-control element 9 is shown in the present case on the underside of the lubricant reservoir 1 in a schematized manner, but is not limited to any particular structure. For example, the temperature controller 9 can be a cavity or channel through which a heating medium or cooling medium can flow, which cavity or channel is integrated into a covering surrounding the lubricant reservoir 1 or a housing of the lubricant reservoir 1.

The control unit 6 is configured to cause the temperature-control element 9 to cool the lubricant 3, provided that the actual lubricant temperature is above the target lubricant temperature range. If the actual lubricant temperature is below the target lubricant temperature range, the controller 6 causes the temperature-control element 9 to heat up the lubricant 3. The associated control and regulation commands are exchanged via the signal connection 8 between the control unit 6 and the temperature-control element 9. In the figure, an optional controller and/or regulator 10 is interposed in relation to the control unit 6 and the temperature-control element 9. Via the control and/or regulation unit 10, the temperature control of the temperature controller 9 is regulated and controlled (in conjunction with the control unit 6). For example, via the regulator 10, a supply line of heating or cooling medium into the cavity or the channel of the temperature-control element 9 can be controlled or regulated at a suitable temperature. For example, the regulator 10 can interact with, operate or control suitable supplies and discharges (e.g., pumps) which cause or regulate, e.g., via supply line(s) or discharge line(s), flow of the heating or cooling medium to the temperature controller 9.

As FIG. 1 further indicates, the control unit 6 is (via a wireless or wired signal connection 12) connected on a signaling technological level to a pressure measuring unit or sensor 11, which is configured to measure a pressure present in the lubricant reservoir 1. The pressure determined in this way can be used to calculate a lower temperature limit of the target lubricant temperature range. The measured pressure represents a condensation pressure of gaseous working medium of the heat pump in the lubricant reservoir.

Figure 2:
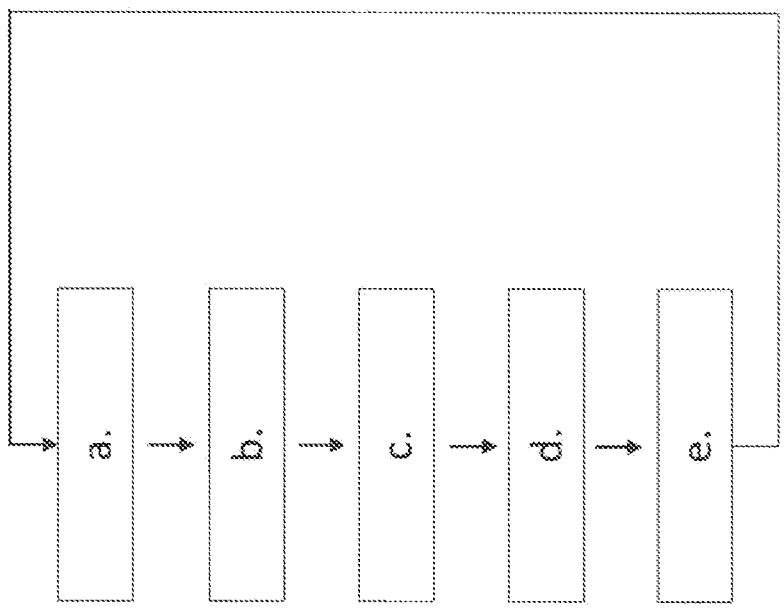
FIG. 2 is a schematic illustration of a temperature management method.

FIG. 2 schematically illustrates a process sequence for control of a lubricant temperature of a lubricant present in a lubricant reservoir 1, e.g., of a compressor system 2 of a heat pump 3 that a working medium flows through.

In a first method step a. a pressure present in the lubricant reservoir 1 is measured (using the pressure sensor 11). In a second process step b. a condensation temperature of the working medium is determined at the pressure that is measured during step a. The identification (calculation) of the condensation temperature is carried out in the controller 6. In a subsequent process step c., a target lubricant temperature range is determined, wherein its lower temperature limit is the condensation temperature of the working medium determined during step b., and wherein its upper temperature limit is 2 K-15 K, such as 5 K-10 K, above the condensation temperature of the working medium. The method step c. is also carried out in the control unit 6 in the illustrated embodiment. In a subsequent step d., an actual lubricant temperature of the lubricant 3 is measured, namely using the temperature probe or sensor 4. Subsequently, in a process step e., the actual lubricant temperature is compared with the target lubricant temperature range. If the actual lubricant temperature is above the target lubricant temperature range, lubricant 3 is cooled. If the actual lubricant temperature is below the target lubricant temperature range, lubricant 3 is heated. As indicated by the arrow representation in FIG. 2, the method can be carried out again, e.g., continuously, i.e., there is a continuous check of the actual lubricant temperature, and a continuous adjustment of the temperature of the lubricant 3 (if necessary).

At least some embodiments can include a pressure measuring unit or pressure sensor connected to the control unit on a signaling technological level, which is configured to measure a pressure present in the lubricant reservoir. "pressure" can also be understood as the vapor pressure of the working medium, which can be at least partially dissolved in the lubricant. In practice, the pressure can be measured in a housing part of the compressor system connected to the lubricant reservoir, for example, in the crankcase. This pressure corresponds to the gas pressure (of the working medium) above the liquid lubricant in the lubricant reservoir. The crankcase and the lubricant reservoir can be connected to the low-pressure side of the heat pump (evaporator, compressor gas inlet). The pressure does not have to be measured directly in the area of a lubricant surface in the lubricant reservoir, but a proportional pressure can also be tapped or measured at another point of the compressor system without any problems.

The pressure can be measured continuously, at fixed time intervals, or at desired points in time. The measured pressure values are forwarded to the controller. In the pressure measuring unit, a pre-processing of the measured pressure values can take place, for example, the provision of the pressure values in a data format suitable for further processing. The recorded or pre-processed pressure values can also be processed in the control unit. The connection on a signaling technological level between the pressure measuring unit and the control unit can be wired or be wireless. The pressure measurement unit can comprise a single pressure sensor, but also a plurality of pressure sensors, in any suitable arrangement. In at least some such embodiments, all of the pressure sensors may be connected to the control unit on a signaling technological level. Alternatively, the pressure sensor can be connected on a signaling technological level to a common microcontroller and the pressure value data collected there can transmitted jointly from the microcontroller to the signaling associated controller. In either the common microcontroller or the control unit, an averaged pressure value can be calculated from the pressure values of the individual pressure sensors as the pressure of the lubricant reservoir (proportional or corresponding to the gas pressure of the working medium).

According to further embodiments, the target lubricant temperature range has a lower temperature limit that corresponds to a condensation temperature of the working medium based on a pressure present in the lubricant reservoir. The condensation temperature is the temperature at which a substance (here the working medium) condenses at a given pressure, i.e., changes from the gaseous to the liquid physical state. The pressure present in the lubricant reservoir is measured with the said pressure sensor(s) and used to calculate the lower temperature limit. Furthermore, other characteristic values can be used for the calculation, such, for example, lubricant-specific data or working medium-specific data that may be stored in the controller or a database. The target lubricant temperature range in such embodiments may therefore be at least partially derived from the specific conditions prevailing in the lubricant reservoir or the compressor system (e.g., the crankcase), which is why the temperature control and, where applicable, adjustment by means of the temperature management system is always appropriate to the situation.

According to further embodiments, the target lubricant temperature range can an upper temperature limit which is 2 K-15 K, or 5 K-10 K, above the condensation temperature of the working medium. The target lubricant temperature range determined by the aforementioned lower temperature limit and upper temperature limit may based in part or primarily on empirical values in such a way that reliable operation of the compressor system of the heat pump is guaranteed at an actual lubricant temperature within this target lubricant temperature range. This applies both to start-up, i.e., starting the system, as well as to operation as such, in which sufficient lubrication of the compressor components needs to be provided.

According to a further embodiments, the controller may be configured to identify the lower temperature limit at a predetermined time, taking into account, at least in part, the pressure measured in the lubricant reservoir at a specified point in time. The calculation can be permored using software executed on the control unit, a calculation routine, or an algorithm, as those skilled in the art should understand. Further, the control unit may be configured to dynamically adjust the target lubricant temperature range, taking into account at least the determined lower temperature limit and an upper temperature limit which is 2 K-15 K, or 5 K-10 K, above the condensation temperature of the working medium. A dynamic adjustment should be understood to mean that the target lubricant temperature range is adapted for conditions at a given time specifically in the lubricant reservoir or in the compressor system. Thus, the proportion of working medium dissolved in the lubricant or mixed with it (e.g., cooling medium) may also be taken into account, because this has a direct effect on the condensation temperature of the working medium and, if applicable, the prevailing pressure in the lubricant reservoir. The controller may be configured to regulate the actual lubricant temperature so that it is always within the target lubricant temperature range in such a way that sufficient lubrication of the compressor components is always ensured during the operation of the compressor system or the heat pump.

As should be understood to those of ordinary skill in the art, the description herein is not intended to disclose all possible embodiments of the invention and combinations of features thereof, and this description should not be interpreted to apply only to the specific exemplary apparatuses described herein or the exemplary methods described herein, or exemplary combination of features. That is, the inventors expressly contemplate that the invention includes any combination or sub-combination of features described herein, regardless of whether such are explicitly described or shown herein.

As may be recognized by those of ordinary skill in the pertinent art based on the teachings herein, numerous changes and modifications may be made to the above-described and other embodiments in the present disclosure without departing from the spirit of the invention as defined in the claims. Accordingly, this detailed description of embodiments is to be taken in an illustrative, as opposed to a limiting sense.

What is claimed is:

1. Temperature management system for a lubricant present in a lubricant reservoir of a compressor system of a heat pump that a working medium flows through, comprising:
   a temperature probe or sensor configured to measure an actual lubricant temperature of the lubricant,
   a control unit in operative signal communication with the temperature probe or sensor and is configured to determine whether the measured actual lubricant temperature is within a target lubricant temperature range;
   a temperature controller in operative signal communication with the control unit and configured to heat or cool the lubricant; and
   a pressure sensor communicatively connected to the control unit and configured to measure a pressure present in the lubricant reservoir;
   wherein the control unit is further configured to
      a. cause the temperature controller to cool the lubricant when the actual lubricant temperature is above the target lubricant temperature range, and
      b. cause the temperature controller to heat up the lubricant when the actual lubricant temperature is below the target lubricant temperature range;
   wherein the target lubricant temperature range has a lower temperature limit and an upper temperature limit, wherein the lower temperature limit corresponds to a condensation temperature of the working medium based on a pressure present in the lubricant reservoir, wherein the pressure is measured by the pressure sensor, wherein the upper temperature limit that is 2-K-15-K above the condensation temperature of the working medium;
   and wherein the control unit is further configured to
      c. determine the lower temperature limit at a predetermined time based on the pressure measured in the lubricant reservoir at said predetermined time.

2. A temperature management system according to claim 1, wherein the control unit is further configured to dynamically adjust the target lubricant temperature range based on the determined lower temperature limit and the upper temperature limit.

3. A temperature management system according to claim 1, wherein the upper temperature limit is 5 K-10 K above the condensation temperature of the working medium.

4. Temperature management system according to claim 1, wherein the control unit is further configured to regulate the actual lubricant temperature to always be within the target lubricant temperature range.

* * * * *